Feb. 3, 1931.  R. R. HOLDEN  1,791,089
TROLLEY EAR
Filed July 25, 1928
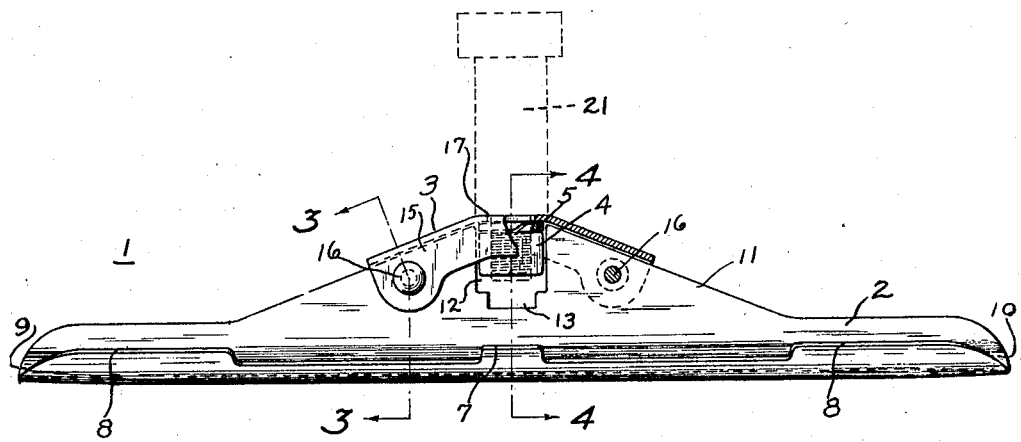
Fig. 1.
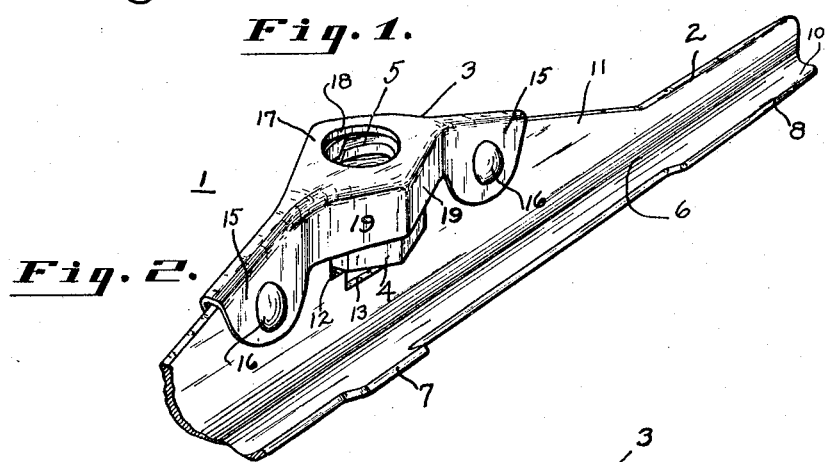
Fig. 2.
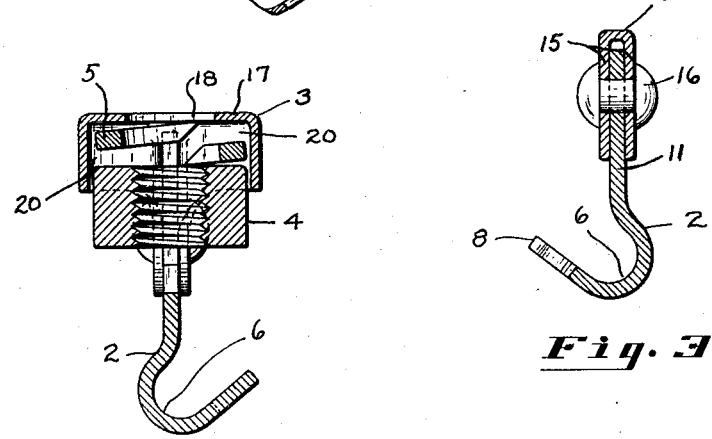
Fig. 4.
Fig. 3
INVENTOR
R. R. Holden
BY
Evans & McCoy
ATTORNEYS Patented Feb. 3, 1931

1,791,089

UNITED STATES PATENT OFFICE

RICHARD ROY HOLDEN, OF HIGHLAND PARK, ILLINOIS

TROLLEY EAR

Application filed July 25, 1928. Serial No. 295,267.

This invention relates to trolley ears and more particularly to the type arranged to support overhead trolley wires.

Objects of the invention are to provide a trolley ear of advantageous material and construction. Further objects are to provide a trolley ear of economical construction and long life and which may be rigidly connected to supporting means and which will retain such rigid connection over an indefinite period.

Other objects of the invention will be apparent to those skilled in the art from the disclosures herein made and from the accompanying drawings wherein:

Figure 1 is a side elevation partly in section of a trolley ear contemplated by my invention;

Fig. 2 is a fragmentary perspective view of a trolley ear shown in Figure 1;

Fig. 3 is a sectional view taken on line 3—3 of Figure 1; and

Fig. 4 is a sectional view taken on line 4—4 of Figure 1.

In the drawings the trolley ear 1 is shown as comprising the body portion 2 and the boss 3, the said body portion and boss having associated therewith the nut 4 and washer 5.

The body portion 2 may be advantageously formed from a sheet of rolled copper as by stamping and bending. Body portions formed thus from rolled or sheet copper have been found to give long life and to be highly resistant to wear under severe usage in trolley systems. The body portion 2 is shown as bent to form a recess 6 to underlie and support a trolley wire (not shown). Extensions 7 and 8 are shown which may be subsequently bent over to hold the trolley wire securely in place. The body portion 2 may be made thinner at the ends 9 and 10 in order to permit a trolley shoe more readily to ride under the trolley ear. Such thinning of the ends 9 and 10 may be accomplished, for example, by employing sheet copper of variable thickness, or by subsequent grinding.

The body portion 2 is shown as provided with an upward extension or fin 11 having substantially centrally disposed slot 12 which may be extended to provide the supplementary slot 13. The slot 12 is arranged to receive a nut 4, and a projecting portion of a bolt or other supporting member may extend into the supplementary slot 13.

Secured to the body portion 2 is the boss 3 which may be made of any suitable material, but which is shown as formed from a steel stamping. The boss 3 has folded-over flanges 15 whereby the boss may be suitably secured to the body portion as by means of the rivets 16 extending through the flanges 15 and fin 11. At its central portion the boss is shown as flattened to form the top 17 which is provided with an aperture 18, and as shaped to form the sides 19 extending angularly outwardly from the fin 11, said central portion thus defining the inner recess 20 which, while it may be of any suitable shape, is shown as of a roughly rectangular cross-section.

Disposed within the recess 20 and the slot 12 is the nut 4, which is prevented from rotation by reason of the shape of the recess 20. The sides of the slot 12 may also serve to limit or prevent rotation of the nut 4.

In the construction shown limited vertical movement of the nut 4 is permitted, the top 17 limiting upward movement and the bottom of the slot 12 limiting downward movement in order that the nut may not be disassociated from the ear. In certain cases, of course, sufficient downward movement might be permitted to allow of disassociation of the nut from the ear structure.

Intermediate the top of the nut 4 and the top 17 of the boss is shown the resilient member or washer 5 arranged to permit of a very rigid and firm connection to a supporting member or bolt such as suggested in dotted lines at 21 in Figure 1 and to prevent chattering of the connection and consequent wearing out of the threads of the nut 4. While the resilient member 5 is illustrated in the form of a lock washer, it will be understood that any suitable equivalent member might be employed. Furthermore, in certain cases an ordinary annular washer might be employed and in other cases the washer might be entirely omitted.

In operation a suitable supporting member such as the insulated bolt 21 is threaded into the nut 4 to draw the nut tightly against the washer 5 and boss top 17 to form a rigid connection.

It will be understood that the boss 3 and nut 4 may be of any suitable shape, suitable means provided to prevent the nut from turning.

It will be further noted that by forming the boss 3 and nut 4 of ferrous material a structure is formed which will not readily wear out. Furthermore, a more rigid and lasting connection can thus be obtained since the portion of the supporting member such as the bolt 21 cooperating with the nut 4 is ordinarily also of ferrous material.

It will further be understood that the use of rolled or sheet copper for the body portion has distinct advantages as to cost, length of life and ease of manufacture.

It will be understood, however, that many of the advantages of my invention may be obtained by forming the trolley ear of materials other than those specifically mentioned in this application. Also, in certain cases, the trolley ear may be formed entirely in one piece of any suitable metal.

It will be obvious that my invention may be applied to what is known in the art as "splicing" trolley ears, as well as to the type illustrated in the drawings.

Furthermore, it is to be understood that the particular forms of apparatus shown and described are presented for purposes of explanation and illustration and that various modifications of said apparatus can be made without departing from my invention as defined in the appended claims.

What I claim is:

1. A trolley ear comprising, in combination, a body portion arranged to cooperate with a trolley wire and a boss arranged to cooperate with a supporting member, said boss having a recess arranged to receive a nut, and an aperture extending from said recess through the top of said boss, said boss being arranged to limit upward movement of said nut, a nut disposed in said recess and means for preventing rotative movement of said nut within said recess, and resilient means interposed between said nut and boss whereby a substantially permanent rigid connection may be maintained between the trolley ear and a supporting member.

2. A trolley ear comprising, in combination, a non-ferrous body portion arranged to cooperate with and support a trolley wire, a metal boss rigidly secured to said body portion, said boss having a recess arranged to receive a nut, shaped to prevent turning of said nut, and having an aperture extending from said recess through the top of said boss to permit a supporting member to extend downwardly to cooperate with said nut, a nut disposed to said recess and resilient means interposed between the top of said nut and the top of said boss to permit a rigid, non-chattering connection to be obtained.

3. A trolley ear comprising, in combination, a copper body portion arranged to cooperate with and support a trolley wire, said body portion having an upwardly extending fin, a ferrous metal boss secured to said fin, said boss having an angularly shaped recess arranged to receive a nut and to prevent said nut from turning, said boss having an aperture extending from said recess upwardly through the top of said boss, a nut disposed within said recess and a lock washer interposed between the top of said nut and the top of said boss to permit a rigid, non-chattering connection to be obtained between said trolley ear and a supporting member.

4. A trolley ear comprising, in combination, a sheet copper body portion arranged to underlie and support a trolley wire, the ends of said underlying portion of the body being thinner to permit a trolley shoe more readily to ride under said trolley ear, a boss associated with said body portion, said boss having a recess arranged to receive a nut, and an aperture extending upwardly from said recess through said boss, a nut disposed within said recess, and means for preventing rotative movement of said nut within said recess.

5. A trolley ear comprising a body portion having a fin extending upwardly therefrom, a slot in said fin of a width to receive a nut, and a member attached to said fin and having portions engageable with top of a nut in said slot and with side faces thereof to retain the nut in said slot and to limit the vertical movement of the nut.

6. A trolley ear comprising a body portion having a fin extending upwardly therefrom, a slot in said fin of a width to receive a nut, and a member attached to said fin and extending across the top of the slot, said member having a polygonal recess in which a nut in said slot fits.

In testimony whereof I affix my signature.

RICHARD ROY HOLDEN.